Figure 1:
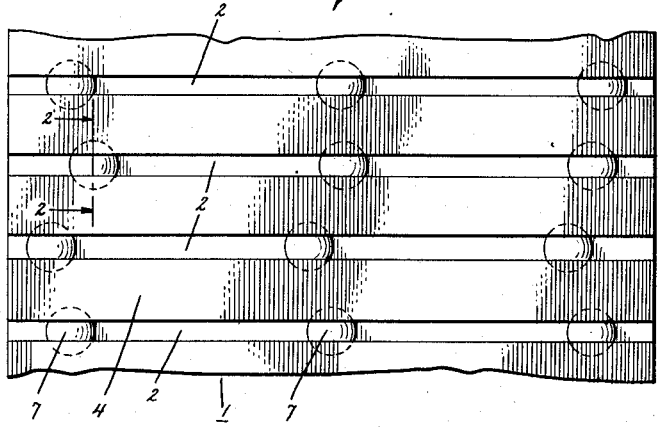

Oct. 28, 1958 G. M. KNAUS 2,858,462
SLOT WEDGE ARRANGEMENT FOR USE IN DYNAMOELECTRIC
MACHINE CORE MEMBERS
Filed May 9, 1957

Inventor:
Gilbert M. Knaus,
by Robert G. Irish
His Attorney.

2,858,462
SLOT WEDGE ARRANGEMENT FOR USE IN DYNAMOELECTRIC MACHINE CORE MEMBERS

Gilbert M. Knaus, Fort Wayne, Ind., assignor to General Electric Company, a corporation of New York Application May 9, 1957, Serial No. 658,142

2 Claims. (Cl. 310—214)

This invention relates to dynamoelectric machines, and more particularly to an improved slot wedge arrangement for use in securing the coils within the slots of a dynamoelectric machine core member.

Most dynamoelectric machines have windings which are made up of several turns of magnet wire positioned in the slots of a core member of magnetic material. While the magnet wire is generally made of some material having an inherently small amount of resilience, such as copper or aluminum, the physical form of the winding is such that unless the turns of wire are secured within the slots, they may force themselves out through the slot opening and eventually interfere with operation of the machine. In order to prevent this, the slots of dynamoelectric machine core members are generally provided with wedges which are inserted after the windings have been placed so as to be wedged between the slot opening and the wire thereby preventing the wire from coming out through the opening. Generally, in the past, such wedges have been formed of stiff paper, wood, etc. Such materials are suitable because they lack brittleness but have a reasonably high degree of stiffness. However, they also tend to absorb moisture, that is, they are hygroscopic, and there are many applications at the present time (in hermetically sealed compressor motors, for one instance) where it is important that a minimum of hygroscopic material be included in the motor. In such cases, it is highly desirable that the slot wedges should not be of the standard hygroscopic materials, and efforts have been made in the past to substitute non-hygroscopic material such as glass.

The regular shape of a slot wedge is such that it usually extends the full length of the slot but is, of course, limited to the width of the slot so that, as a result, it is a long thin member. While wood and paper readily assume such a shape without difficulty, most reasonably economical non-hygroscopic materials such as glass become exceedingly brittle and difficult to use under such circumstances. It is therefore highly desirable to combine the non-hygroscopic features of glass and many other ceramic materials with the sturdiness needed to preclude an undue amount of breakage and waste in the manufacturing process.

It is, therefore, an object of this invention to provide, for use in the slots of dynamoelectric machine core members, an economical wedge arrangement which has the non-hygroscopic features of most ceramic materials but does not have the brittle characteristic which such materials often include in most shapes.

In one aspect thereof, the invention provides a core member of magnetic material which has slots formed therein which open onto a surface thereof in the usual manner. A plurality of lengths of wire are positioned in each of the slots so as to form windings. In order to retain the wires in each slot, there are provided means which comprise a plurality of parts of ceramic material each of which is wedged in a slot between the wires and the slot opening. The parts in any one slot are substantially spaced from each other; each one extends only a short distance along the slot relative to its width and has a smoothly contoured outer surface. In order to prevent any endwise movement of the parts within the slot, an adhesive material, such as is frequently applied to the windings of dynamoelectric machines in the normal course of events, is used to secure the parts.

The features of the invention which are believed to be novel are set forth with particularity in the appended claims. The invention itself, however, together with further objects and advantages thereof, may best be understood by reference to the following description taken in connection with the accompanying drawing.

Figure 2:
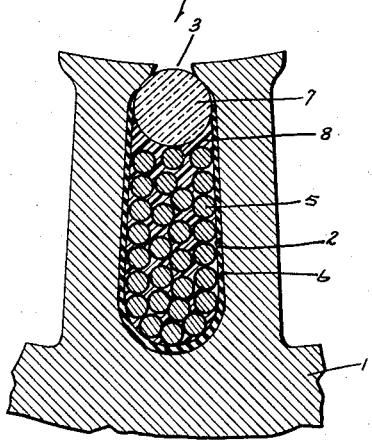

In the drawing, Figure 1 is a plan view of a segment of a dynamoelectric machine core member; and Figure 2 is a view along line 2—2 in Figure 1.

Referring now to the figures of the drawing, there is shown a dynamoelectric machine core member 1 which may be formed, as shown, in the usual manner from a stacked plurality of thin laminations of magnetic material. A plurality of slots 2 are formed in the core member 1 with each of the slots having an opening 3 at the surface 4 of the core member 1. A winding formed of a number of turns of wire 5 is positioned in the slots and may, as is commonly the case, be insulated from the core member 1 by a suitable slot liner member 6.

In order to secure the wires 5 within the slots 2, and to prevent them from forcing themselves out through slot opening 3, suitable slot wedge means are provided to retain the wire 5 in place within the slots. In the applicant's improved construction, the wedge means include a plurality of smoothly contoured parts 7. Each one extends for only a short distance along the slot relative to its width so as to eliminate the long thin shape which brings out any brittleness a material may inherently have. In the preferred arrangement, parts 7 are beads formed from a suitable ceramic material such as, for instance, glass porcelain, or pottery, among many possibilities. Such beads can be manufactured exceedingly inexpensively so as to be substantially spherical, with a completely smooth contour, by the simple expedient of heating the ceramic material to the melting point, pouring it through a screen, and letting the material fall a predetermined distance through any suitable cooling medium such as the atmosphere. As the individual particles formed by passing the molten ceramic through the screen, they cool and solidify; as they do so, they inherently form themselves into spheres. This is a standard method of producing glass beads at the present time, so far as is known, and the size of the beads may be determined (up to reasonable limits) by the size of the screen openings through which the ceramic is poured. Thus, the spherical glass bead 7 which constitutes the preferred construction of this invention is a part which is exceedingly cheap and readily available. The spherical feature makes the part very strong, being the antithesis of a long thin member, and minimizes the brittle nature of glass and most ceramics. At the same time, it is of a material which has very high non-hygroscopic and insulating qualities.

The parts 7 may easily be inserted into the slots by introducing them at an end and sliding them along within the slot until they are correctly positioned. The smooth contour of each part 7 precludes damage to the insulating covering normally provided around each length of wire. As can be seen, the wedging action of each part 7 makes it unnecessary for wedging means to be provided along the entire length of the slot; consequently, relatively few parts 7 are needed for each slot, the number needed being a function of the length of the slot. It is conceivable that in a short core member, a single part 7 might be sufficient; in an exceedingly long one, even more than the three shown in Figure 1 might be necessary.

Once parts 7 are in position in the slots 2, a suitable adhesive material 8 is applied so as to secure each part 7 to the sides of the slot 2 to prevent it from moving endwise within the slot. Adhesive 8 may, for instance, be any one of many varnishes which are frequently applied to windings after they have been positioned within the slots in dynamoelectric machine core members. Another possibility is that the adhesive may be part of a mass of resin used to encapsulate the winding which is formed by wires 5. In any event, it will be clear that in many cases the adhesive which secures part 7 may already be provided for other purposes in connection with the winding.

It will be seen from the foregoing that the invention provides an arrangement for wedging the wire which forms the windings of a dynamoelectric machine into the slots by means of a strong non-hygroscopic material provided in a shape which will not harm the windings nor will have the previous tendency to brittleness.

While the invention has been explained by describing a particular embodiment thereof, it will be apparent that improvements and modifications may be made without departing from the scope of the invention as defined in the appended claims.

What I claim as new and desire to secure by Letters Patent of the United States is:

1. A core member of magnetic material having slots formed therein opening onto a surface thereof; a plurality of lengths of wire positioned in each said slot; means for retaining said wires in each said slots comprising a plurality of substantially spherical parts of ceramic material wedged in each said slot between said wires and said slot opening, said parts being substantially spaced from each other; and an adhesive material securing said parts against movement along said slot.

2. A core member of magnetic material having slots formed therein opening onto a surface thereof; a plurality of lengths of wire positioned in each said slot; means for retaining said wires in each said slot comprising a plurality of substantially spherical parts of glass wedged in each said slot between said wires and said slot opening, said parts being substantially spaced from each other; and an adhesive material securing said parts against movement along said slot.

References Cited in the file of this patent

UNITED STATES PATENTS

| | | |
|---|---|---|
| 879,949 | Dunn | Feb. 25, 1908 |
| 880,429 | Treat | Feb. 25, 1908 |
| 1,741,262 | Wait | Dec. 31, 1920 |
| 2,446,708 | Levin | Aug. 10, 1948 |